United States Patent
Neubrand

(10) Patent No.: US 7,559,600 B2
(45) Date of Patent: Jul. 14, 2009

(54) WINDSCREEN DEFLECTOR FOR AUTOMOTIVE VEHICLES

(75) Inventor: Frank Neubrand, West Bloomfield, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 330 days.

(21) Appl. No.: 10/588,886

(22) PCT Filed: Feb. 17, 2005

(86) PCT No.: PCT/US2005/005023

§ 371 (c)(1),
(2), (4) Date: Aug. 9, 2006

(87) PCT Pub. No.: WO2005/080105

PCT Pub. Date: Sep. 1, 2005

(65) Prior Publication Data

US 2007/0170752 A1    Jul. 26, 2007

Related U.S. Application Data

(60) Provisional application No. 60/545,360, filed on Feb. 17, 2004.

(51) Int. Cl.
*B60J 9/04* (2006.01)
*B62D 35/00* (2006.01)
(52) U.S. Cl. .................................................. 296/180.1
(58) Field of Classification Search ... 296/180.1–180.5, 296/37.16; 280/756; 180/903
See application file for complete search history.

(56) References Cited

U.S. PATENT DOCUMENTS

| 4,202,577 | A | * | 5/1980 | Breitschwerdt et al. .. 296/24.43 |
| 5,211,718 | A | | 5/1993 | Gotz et al. |
| 5,632,520 | A | * | 5/1997 | Butz ........................ 296/24.43 |
| 5,738,404 | A | * | 4/1998 | Stadler et al. ............ 296/180.1 |
| 5,803,530 | A | | 9/1998 | Skrzypek et al. |
| 6,030,027 | A | * | 2/2000 | Graf ........................ 296/180.1 |
| 6,554,349 | B2 | | 4/2003 | Gloss |
| 6,692,063 | B2 | * | 2/2004 | Dreher et al. ............ 296/180.1 |
| 6,926,062 | B2 | * | 8/2005 | Neumann et al. ........... 160/371 |
| 7,367,608 | B2 | * | 5/2008 | Rimmelspacher et al. ........................ 296/180.1 |

FOREIGN PATENT DOCUMENTS

DE           10345292        4/2005

\* cited by examiner

*Primary Examiner*—H Gutman
(74) *Attorney, Agent, or Firm*—Gifford, Krass, Sprinkle, Anderson & Citkowski, P.C.

(57) ABSTRACT

A widescreen deflector assembly is provided for an automotive vehicle having a passenger compartment extending between opposing side walls and a rear end, wherein the passenger compartment includes front seats and rear seats. The widescreen deflector assembly includes a membrane element. A first cross member is connected to an end of the membrane element. A second cross member is operatively coupled to the vehicle for movement between a retracted position disposed along the rear end of the passenger compartment and a use position disposed between the front and rear seats of the passenger compartment. A linkage is operatively coupled between the first and second cross members, so that the first cross member in the use position is spaced above the second cross member, such that the membrane element extends between the first and second cross members to form a substantially upright windscreen portion and further extends between the second cross member and the rear end of the passenger compartment to form a substantially horizontal cover portion covering the rear seats of the passenger compartment.

20 Claims, 6 Drawing Sheets

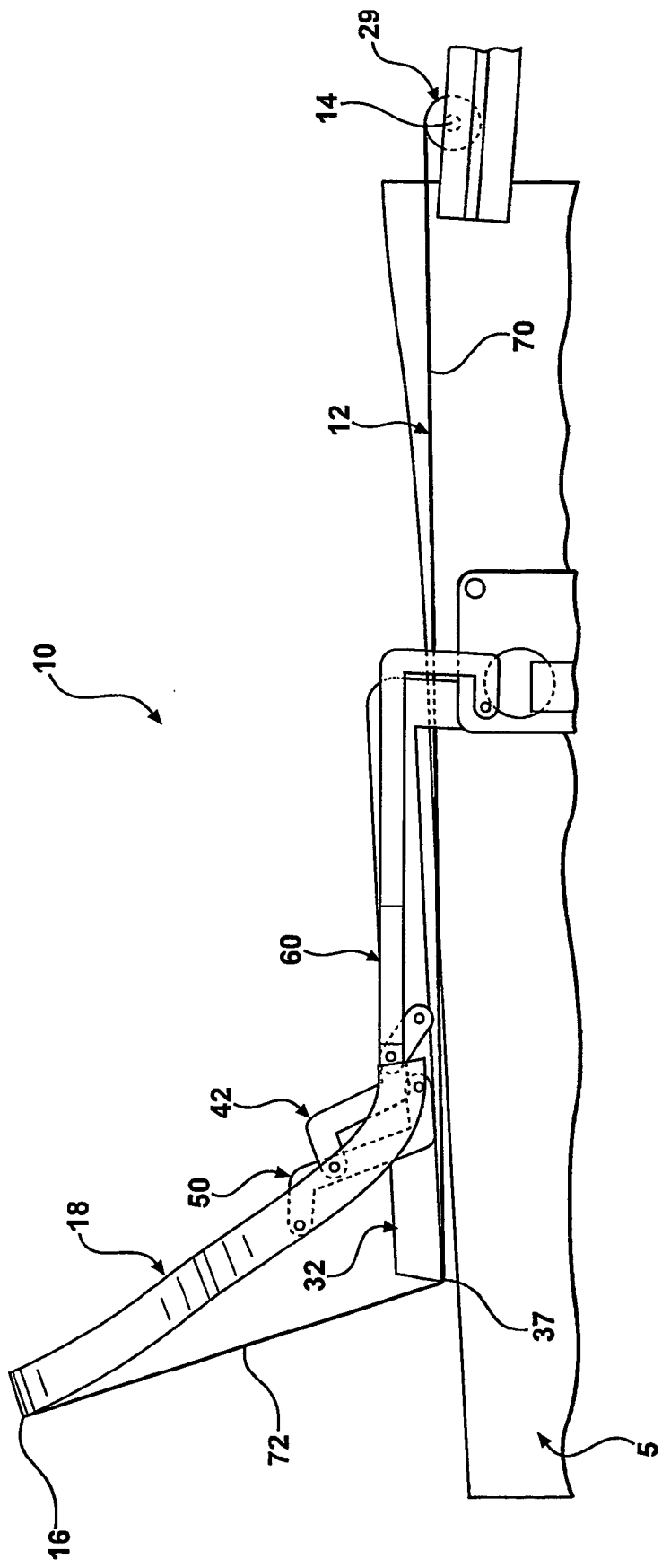

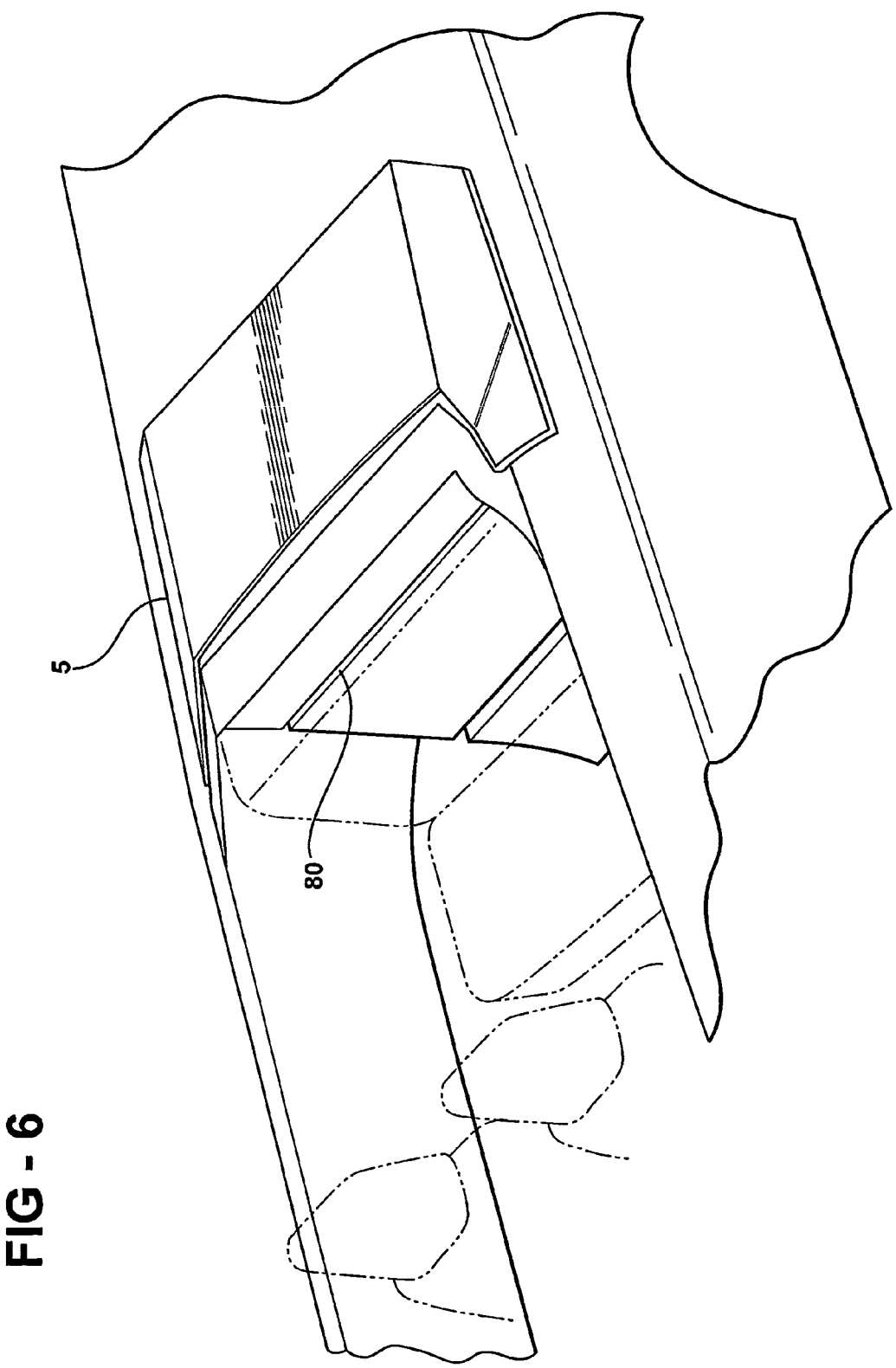

WINDSCREEN DEFLECTOR FOR AUTOMOTIVE VEHICLES

REFERENCE TO RELATED APPLICATION

This application claims priority from PCT/US2005/005023, filed Feb. 17, 2005, which claims priority from U.S. Provisional Application Ser. No. 60/545,360, Feb. 17, 2004, the entire content of both of which is incorporated herein by reference.

FIELD OF THE INVENTION

The invention relates to windscreen deflectors for convertible automotive vehicles. More specifically, the invention relates to a deflector assembly having first and second cross members for moving a membranous windscreen between extended and retracted positions.

BACKGROUND OF THE INVENTION

It is known to provide a windscreen behind the head restraints of the front seats of a convertible car to minimize buffeting experienced by the front passengers caused by eddy currents while driving in the car.

An example of a windscreen is provided in U.S. Pat. No. 5,211,718 ('718) to Götz et al. The '718 reference discloses a wind deflecting cover having a vertical windscreen that is extendable from a wind-up spool or roller disposed immediately behind the front seats. The cover is extended upwardly and secured to a cross member of a roll bar. A horizontal frame extends along a space between the roller and a rear end of the passenger compartment. The frame is covered with a net to form a resting cover. The frame and resting cover are not, however, movable or collapsible to accommodate a row of seats between the front seats and the rear end of the passenger compartment.

Another windscreen is disclosed in U.S. Pat. No. 6,030,027 ('027) to Graf. The '027 reference discloses a wind protection arrangement having a flexible membrane extendable from a spool supported along a rear end of the passenger compartment. A bow is pivotally coupled to the vehicle body. A deflecting support is pivotally coupled to the bow. The membrane extends horizontally between the rear end of the passenger compartment and the deflecting support. The membrane continues vertically from the deflecting support, so that an end of the membrane is fixedly secured to an upper transversely extending bar of the bow. A retracting mechanism extends between the rear end of the passenger compartment and the deflecting member. As in the '718 reference, the retracting mechanism of the '027 reference would interfere with and, therefore, not accommodate a row of seats between the front seats and the rear end of the passenger compartment.

Accordingly, it remains desirable to provide a windscreen design usable in a passenger vehicle having front and rear seats and a device for moving the windscreen between a retracted position stored behind the rear seats and an extended position disposed behind the head restraints of the front seats.

SUMMARY OF THE INVENTION

According to a first embodiment of the present invention, a windscreen deflector assembly is provided for an automotive vehicle having a passenger compartment extending between opposing sidewalls and a rear end. The passenger compartment includes front seats and rear seats. The windscreen deflector assembly includes a flexible membrane element, a first cross member interconnected with an end of the membrane element and a second cross member operatively coupled to the vehicle for movement between a retracted position disposed along the rear end of the passenger compartment and a use position disposed between the front and rear seats of the passenger compartment. The assembly further includes a linkage operatively coupled between the first and second cross members so that the first cross member is carried by the second cross member during movement between the retracted and use positions. The first cross member in the use position is spaced above the second cross member such that the membrane element extends between the first and second cross members to form a generally upright windscreen portion and further extends between the second cross member and the rear end of the passenger compartment to form a generally horizontal cover portion covering the rear seats of the passenger compartment.

The first cross member may include a transversely extending beam fixedly secured to the end of the membrane element and side members extending from respective opposite ends of the beam. The second cross member may include a transversely extending crossbar and a pair of legs extending from respective opposite sides thereof. The linkage may include a pair of first and second links arranged as a four-bar link connecting the side members of the first cross member and a leg for the second cross member.

In some versions, a portion of at least one of the side members of the first cross member and the legs of the second cross member are offset transversely to accommodate articulation of the linkage as the first and second cross members are moved between the retracted and use positions. In some versions, the wind deflector assembly includes a rod extending between one end pivotally coupled to the vehicle and an opposite end pivotally coupled to one of the first and second links.

The legs of the second cross member may be pivotably coupled to the vehicle for movement of the second cross member between the retracted and use positions. Each side member of the first cross member may be generally S-shaped to define an inner portion that extends orthogonally from the beam. The S-shaped side members may further define an outer portion that is spaced transversely from the inner portion defining a space between a side member and the leg to accommodate the linkage therebetween. The wind deflector assembly may further include a spool rotatably coupled to the vehicle, with the spool fixedly secured to a second end of the membrane element. The spool is continuously rotatably biased so the membrane element is wound about the spool as the first and second cross members are moved to the retracted position. In a preferred arrangement, the beam of the first cross member and the bar of the second cross member remain substantially parallel as the first and second cross members are articulate between the retracted and use positions. Preferably, the beam and the bar are adjacent one another in a retracted position.

In another embodiment of the present invention, a windscreen deflector assembly is provided for an automotive vehicle having a passenger compartment including front seats and rear seats. The windscreen deflector assembly includes a flexible membrane element, a first cross member and a second cross member. The first and second cross members have a retracted position with at least one of the first and second cross members disposed adjacent the rear end of the passenger compartment at a use position with both first and second cross members positioned between the front and rear seats with one of the first and second cross members spaced substantially above the other of the first and second cross members. In the use position, the membrane element extends between the first and second cross members to form a generally upright windscreen portion and further extends between the lower of the cross members and the rear end of the passenger compartment to form a generally horizontal cover portion covering the rear seats of the passenger compartment. The first cross member may include a transversely extending beam fixedly secured to an end of the membrane element. The first cross member may further include side members extending from respective opposite ends of the beam. A second cross member may include a transversely extending cross bar and a pair of legs extending from respective opposite sides thereof. The linkage may include a pair of first and second links arranged as a four-bar link connecting the side members of the first cross member and the legs of the second cross member.

In yet another embodiment of the present invention, a wind deflector assembly is provided for an automotive vehicle having a passenger compartment extending between opposing sidewalls and a rear end, wherein the passenger compartment includes a front seat. The deflector assembly includes a flexible membrane element, a first cross member, and a second cross member. The first cross member has a transversely extending beam interconnected with an end of the membrane element. The second cross member has a transversely extending crossbar operatively coupled to the vehicle for movement between a retracted position with a crossbar disposed along the rear end of the passenger compartment and a use position with the crossbar disposed behind the front seat of the passenger compartment. The assembly further includes a linkage operatively coupled between the first and second cross members so that the first cross member is carried by the second cross member during movement between the retracted and use positions. The first cross member may include parallel and spaced apart side members extending substantially orthogonally from opposite ends of the transversely extending beam. The second cross member may include generally parallel and spaced apart legs extending from opposite ends of the transversely extending crossbar, with the legs being pivotally coupled to the vehicle for movement of the second cross member between the retracted and use positions. The linkage may include a pair of first and second links arranged as a four-bar link connecting the side members of the first cross member and the legs in the second cross member. In some embodiments, the cross bar in the use position is disposed between the front seat and a rear seat in the passenger compartment.

BRIEF DESCRIPTION OF THE DRAWINGS

Advantages of the present invention will be readily appreciated as the same becomes better understood by reference to the following detailed description when considered in connection with the accompanying drawings, wherein:

FIG. 5 is a side elevational view of the retractable windscreen assembly in the extended position; and FIG. 6 is a perspective view of the retractable windscreen assembly in the retracted position.

DETAILED DESCRIPTION OF THE PREFERRED EMBODIMENT

Figure 1:
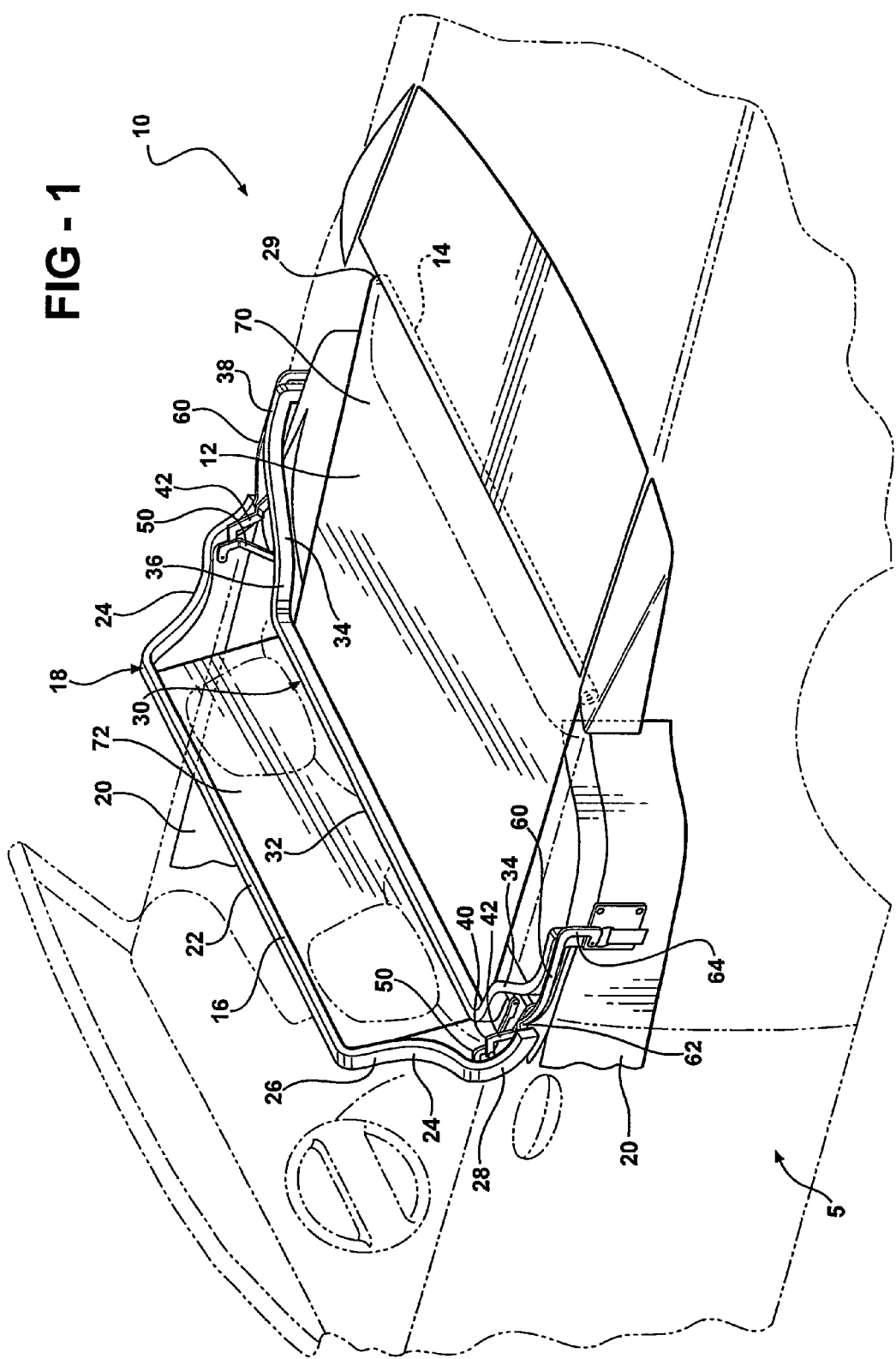
FIG. 1 is a rear perspective view of a retractable windscreen assembly according to one embodiment of the invention, with the windscreen assembly shown in the extended position.

Referring to FIGS. 1 through 6, a retractable windscreen assembly for selectively covering a portion of a passenger compartment of a convertible automotive vehicle 5 is generally indicated at 10. The windscreen assembly 10 includes a membranous windscreen 12 that extends longitudinally in the vehicle 5 between a fixed end 14 and an opposite mobile end 16. A first cross member 18 extends transversely between opposing side walls 20 in the vehicle 5 for supporting the mobile end 16 of the windscreen 12. More specifically, the first cross member 18 includes a generally horizontal beam 22 extending between symmetrically opposite and spaced apart side members 24. The mobile end 16 of the windscreen 12 is fixedly secured along the beam 22. Each side member 24 is generally S-shaped to define an inner portion 26 extending generally orthogonally from the beam 22 and a distal outer portion 28 stepped transversely outwardly from the inner portion 26. The fixed end 14 of the windscreen 12 is fixedly secured to a spool 29 rotatably coupled to a rear end of the passenger compartment. The spool 29 is rotatably biased so that the windscreen 12 is continuously tensioned between the fixed 14 and mobile 16 ends.

Figure 4:
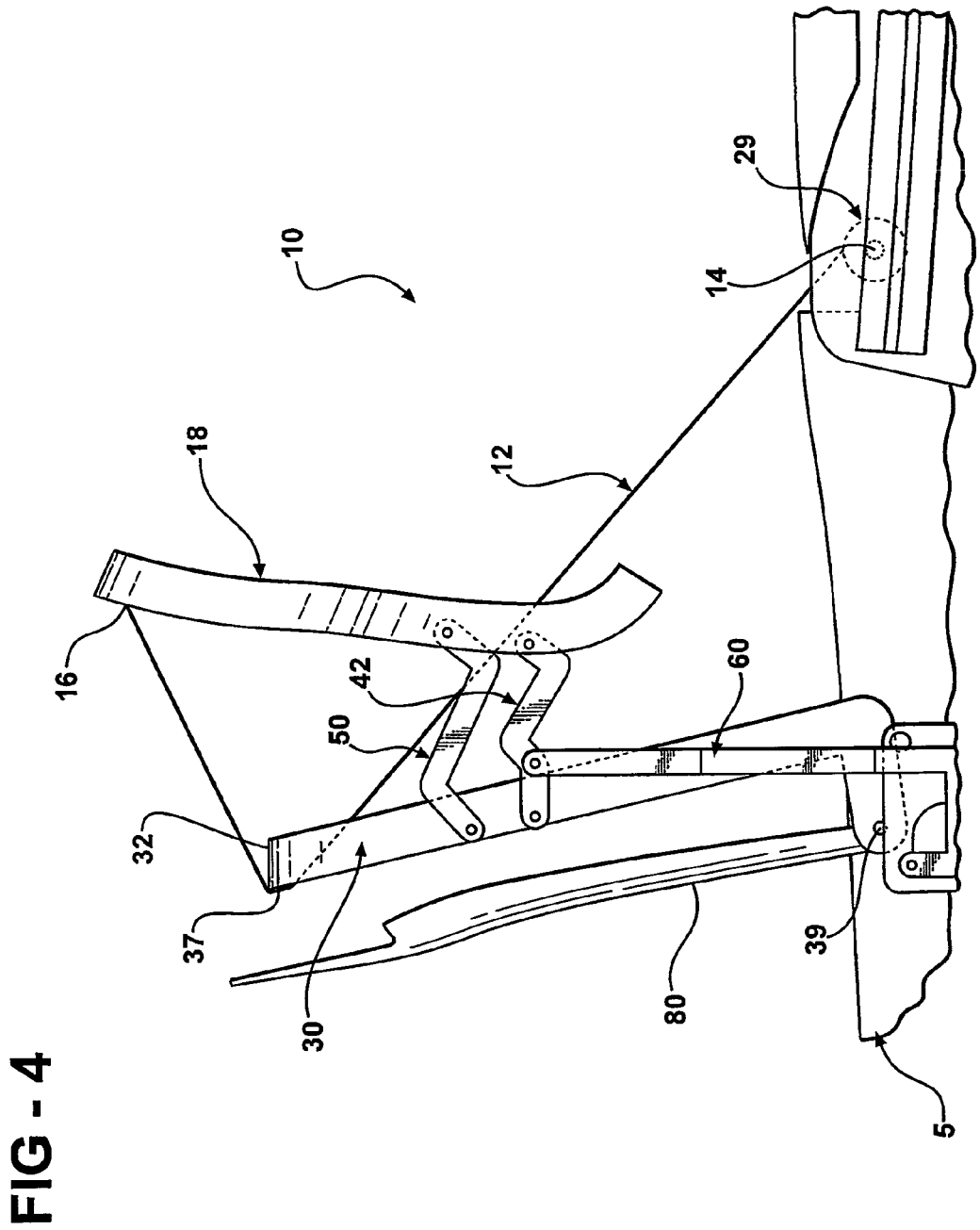
FIG. 4 is a side elevational view of the retractable windscreen assembly in an intermediate position between the extended and retracted positions.

A second cross member 30 extends transversely between the side walls 20 of the vehicle 5. The second cross member 30 includes a generally horizontal cross bar 32 extending between symmetrically opposite and spaced apart legs 34. As best shown in FIGS. 4 and 5, the cross bar 32 includes a leading edge 37, which is adapted to slidably contact the windscreen in a non-abrading manner. Preferably, the leading edge 37 is smooth to minimize friction with the windscreen 12. Alternatively, a plurality of rollers (not shown) can be disposed along the leading edge 37 for rollingly engaging the windscreen 12. Each leg 34 is generally S-shaped to define an inner portion 36 extending generally orthogonally from the cross bar 32 and a distal outer portion 38. The outer portion 38 of each leg 34 is stepped transversely outwardly from the inner portion 36 and pivotally coupled to the side walls 20 of the vehicle 5 for pivotal movement about a fixed axis 39.

Figure 2:
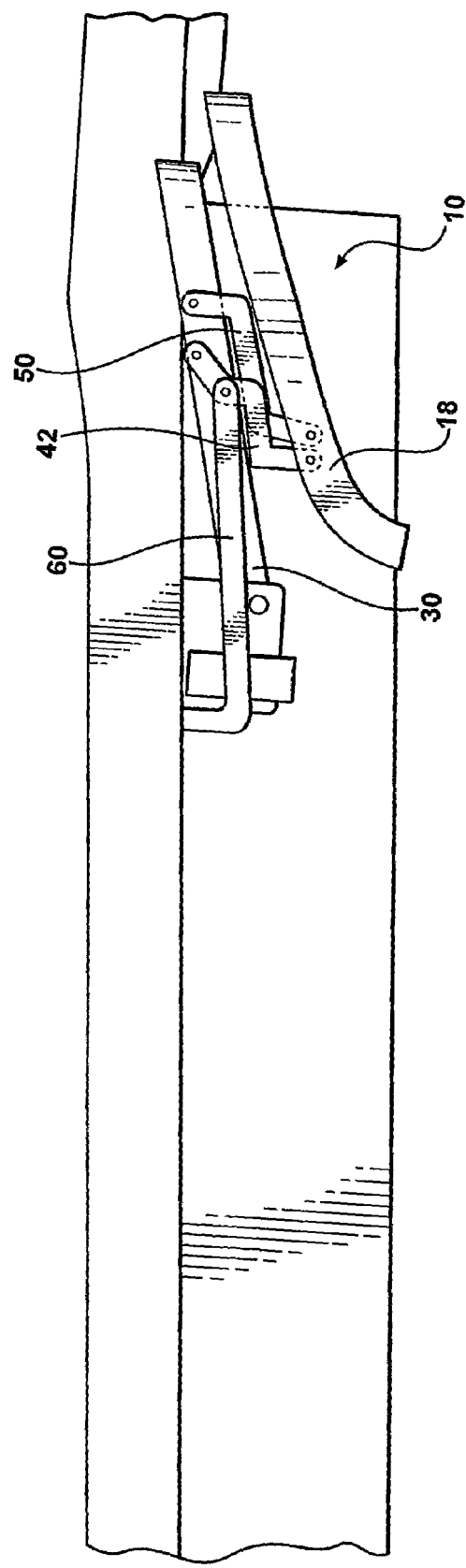
FIG. 2 is a side elevational view of the retractable windscreen assembly in a retracted position.
Figure 3:
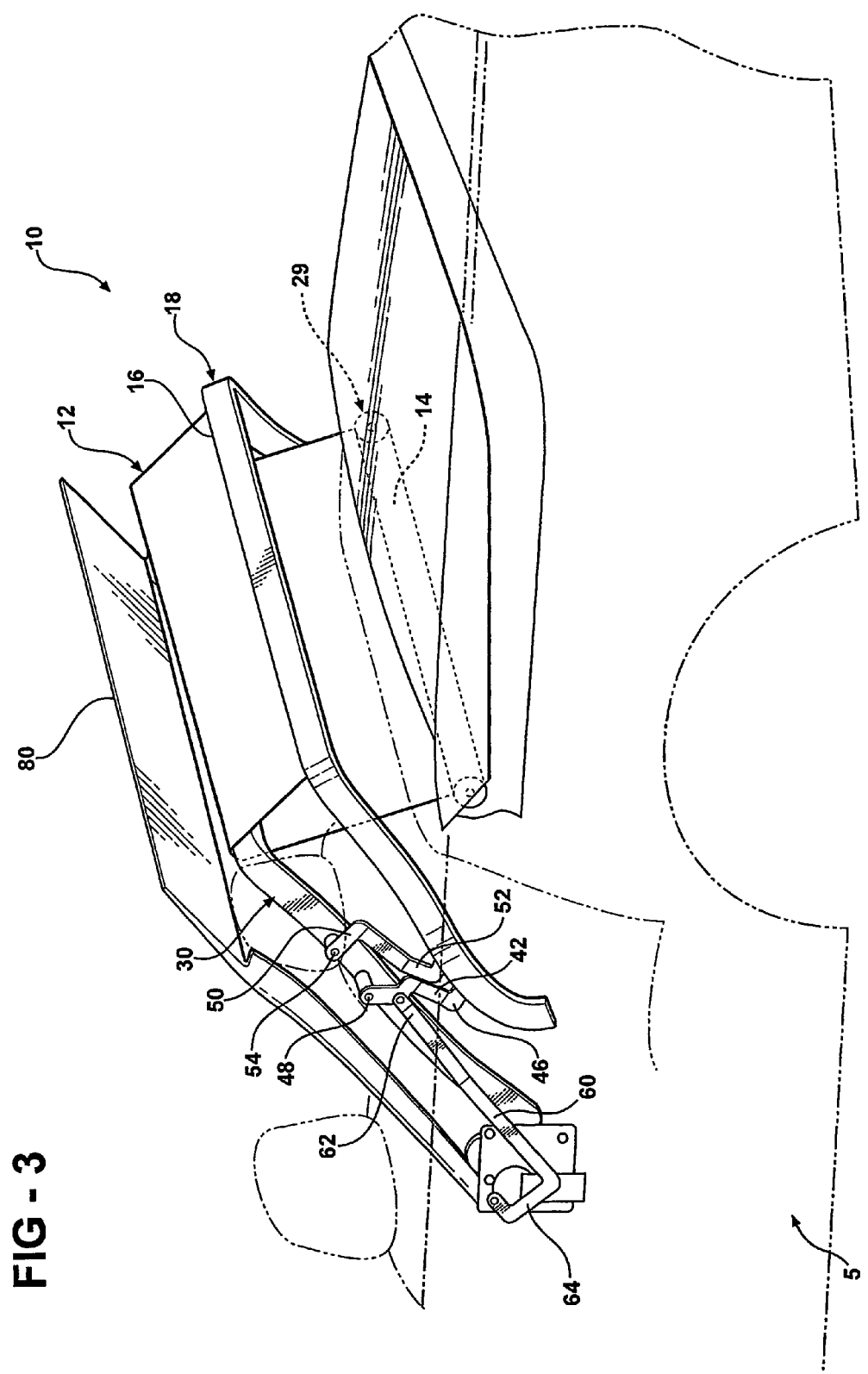
FIG. 3 is rear perspective view of the retractable windscreen assembly in an intermediate position between the extended and retracted positions.

The outer portions 28 of each side member 24 are spaced apart from the inner portions 36 of each leg 34 to accommodate each of a pair of links defining a four-bar linkage 40. The linkage 40 includes a first link 42 and a second link 50. Both the first 42 and second 50 links are generally S-shaped. As best shown in FIG. 3, the first link 42 extends between a first end 46 pivotally coupled to the first cross member 18 and an opposite second end 48 pivotally coupled to the second cross member 30. The second link 50 extends between a first end 52 pivotally coupled to the first cross member 18 and an opposite second end 54 pivotally coupled to the second cross member 30. The linkages 40 allow the first 18 and second 30 cross members to move together between an extended position, as shown in FIGS. 1 and 5, and a storage or retracted position, as shown in FIGS. 2 and 6.

A pair of actuating rods 60 each extend between an upper end 62 and a lower end 64. The upper end 62 of each rod 60 is pivotally coupled to the first link 42 of each linkage 40. The lower end 62 of each rod 60 is pivotally coupled to each of the side walls 20 of the vehicle 5. The lower end 62 of at least one of the rods 62 is operatively coupled to a drive mechanism, such as an electric motor or cylinder-type actuator, fixedly disposed within one of the side walls 20 of the vehicle 5. The drive mechanism actuates the first 18 and second 30 cross members between the extended and retracted positions by pivotally driving the rod 62 relative to the side wall 20.

In use, the drive mechanism is selectively energized by a switch in the passenger compartment in the vehicle 5, as commonly known by those skilled in the art. Movement of the deflector assembly from the retracted position to the extended position is now described. In the retracted position, the first 18 and second 30 cross members are stacked in a recess disposed behind the passenger compartment in the vehicle 5. The windscreen 12 is retracted and stored in a spiral manner around the spool 29. The drive mechanism is energized to cause counterclockwise movement of the rod 60 about its lower end 64. The counterclockwise movement of the rod 60 pushes the first link 42 counterclockwise about its first end 46. The second link 50, interconnected to the first link 42 by the first cross member 18, moves counterclockwise about its first end 52 in response to the counterclockwise movement of the first link 42. The first cross member 18 swings with the links 42, 44 about the first ends 46, 52 and remains generally upright as the second cross member 30 rotates counterclockwise about the fixed axis 39. The windscreen 12 is pulled at its mobile end 16 from the spool 29 by the first cross member 18. As the deflector assembly 10 continues from an intermediate position shown in FIGS. 3 and 4, the beam 22 and the cross bar 32 move apart as the first cross member 18 maintains a generally upright orientation with respect to the second cross member 30. The membrane 12 is continuously tensioned about leading edge 37 of the cross bar 32. The rod 60 continues to push on the first link 42 until the deflector assembly 10 reaches the extended position, shown in FIGS. 1 and 5. In the extended position, the first cross member 18 is generally upright and the second cross member 30 is generally horizontal. The membrane 12 is tensioned about the leading edge 37 defining a cover portion 70 and a deflector portion 72. The cover portion 70 is generally horizontal to cover the passenger compartment between the cross bar 32 and the spool 29. The deflector portion 72 is generally upright between the cross bar 32 and the beam 22 to deflect wind eddies away from the heads of passengers seated in the front of the passenger compartment. The deflector assembly 10 can be returned to the retracted position by reversing the foregoing operation.

Preferably, a door or cover 80 is pivotally coupled to the vehicle for movement with the retractable windscreen assembly between the extended and retracted positions. In the extended position, the cover 80 is disposed beneath the second cross member 30. In the retracted position, the cover 80 conceals the assembly 10 while disposed within the recess behind the passenger compartment The cover 80 in the retracted position is preferably flush with adjacent body or trim panels of the vehicle. Optionally, the cover may be in the form of a trap door that articulates out of the way of the windscreen assembly 10 as it moves between the retracted and extended positions and returns to the retracted position to conceal the recess behind the passenger compartment. That is, the trap door conceals the recess behind the passenger compartment even while the windscreen assembly 10 is in the extended position.

The invention has been described in an illustrative manner. It is, therefore, to be understood that the terminology used is intended to be in the nature of words of description rather than of limitation. Many modifications and variations of the invention are possible in light of the above teachings.

I claim:

1. A windscreen deflector assembly for an automotive vehicle having a passenger compartment extending between opposing side walls and a rear end, wherein the passenger compartment includes front seats and rear seats, said windscreen deflector assembly comprising:

a flexible membrane element;

a first cross member having a transversely extending beam fixedly secured to an end of the membrane element, the first cross member also having side members extending from respective opposite ends of the beam;

a second cross member operatively coupled to the vehicle between a retracted position disposed along the rear end of the passenger compartment and a use position disposed between the front and rear seats of the passenger compartment, the second cross member having a transversely extending cross bar and a pair of legs extending from respective opposite sides thereof;

a linkage having a pair of first and second links arranged as a four-bar link connecting the side members of the first cross member and the legs of the second cross member and operatively coupled between the first and second cross members so that the first cross member is carried by the second cross member during movement between the retracted and use positions, whereby the first cross member in the use position is spaced above the second cross member such that the membrane element extends between the first and second cross members to form a generally upright windscreen portion and further extends between the second cross member and the rear end of the passenger compartment to form a generally horizontal cover portion covering the rear seats of the passenger compartment.

2. A windscreen deflector assembly as set forth in claim 1, wherein a portion of at least one of the side members of the first cross member and legs of the second cross member is offset transversely to accommodate articulation of the linkage as the first and second cross members are moved between the retracted and use positions.

3. A windscreen deflector assembly as set forth in claim 1 including a rod having one end pivotally coupled to the vehicle and an opposite end pivotally coupled to one of the first and second links.

4. A windscreen deflector assembly as set forth in claim 1, wherein the legs are pivotally coupled to the vehicle for movement of the second cross member between the retracted and use positions.

5. A windscreen deflector assembly as set forth in claim 1, wherein each side member is generally S-shaped to define an inner portion that extends orthogonally from the beam.

6. A windscreen deflector assembly as set forth in claim 5, wherein each side member is generally S-shaped to define an outer portion that is spaced transversely from the inner portion defining a space between the side member and the leg to accommodate the linkage therebetween.

7. A windscreen deflector assembly as set forth in claim 1 including a spool rotatably coupled to the vehicle, the spool adapted to be fixedly secured to a second end of the membrane element, the spool being continuously rotatably biased so the membrane element is wound about the spool as the first and second cross members are moved to the retracted position.

8. A windscreen deflector assembly as set forth in claim 1, wherein the beam and the cross bar remain substantially parallel as the first and second cross members articulate between the retracted and use positions.

9. A windscreen deflector assembly as set forth in claim 1, wherein the beam is adjacent the cross bar in the retracted position.

10. A windscreen deflector assembly as set forth in claim 1 including a cover coupled to the vehicle with the first and second cross members between the retracted and use positions, wherein the cover in the retracted position overlies the first and second cross members.

11. A windscreen deflector assembly for an automotive vehicle having a passenger compartment including front seats and rear seats, said windscreen deflector assembly comprising:
a flexible membrane element, a first cross member, and a second cross member;
the first cross member having a transversely extending beam fixedly secured to an end of the flexible membrane element and side members extending from respective opposite ends of the transversely extending beam;
the second member having a transversely extending cross bar and a pair of legs extending from respective opposite ends of the transversely extending cross bar;
a pair of first and second side links arranged as a four-bar link connecting the side members of the first cross member and the legs of the second cross member;
wherein both the first and second cross members have a retracted position with at least one of the first and second cross members disposed adjacent the rear end of the passenger compartment and a use position with both first and second cross members positioned between the front and rear seats with one of the first and second cross members spaced substantially above the other of the first and second cross members, such that in the use position the membrane element extends between the first and second cross members to form a generally upright windscreen portion and further extends between the lower of the cross members and the rear end of the passenger compartment to form a generally horizontal cover portion covering the rear seats of the passenger compartment.

12. A windscreen deflector assembly for an automotive vehicle having a passenger compartment extending between opposing side walls and a rear end, wherein the passenger compartment includes a front seat, said windscreen deflector assembly comprising:
a flexible membrane element;
a first cross member having a transversely extending beam interconnected with an end of the membrane element, the first cross member also having generally parallel and spaced apart side members extending substantially orthogonally from opposite ends of the transversely extending beam;
a second cross member having a transversely extending cross bar operatively coupled to the vehicle for movement between a retracted position with the cross bar disposed along the rear end of the passenger compartment and a use position with the cross bar disposed behind the front seat of the passenger compartment, the second cross member also having generally parallel and spaced apart legs extending from opposite ends of the transversely extending cross bar, the legs being pivotally coupled to the vehicle for movement of the second cross member between the retracted and use positions;
a linkage having a pair of first and second links arranged as a four-bar link connecting the side members of the first cross member and the legs of the second cross member and operatively coupled between the first and second cross members so that the first cross member is carried by the second cross member during movement between the retracted and use positions.

13. A windscreen deflector assembly as set forth in claim 12, wherein the cross bar in the use position is disposed between the front seat and a rear seat of the passenger compartment.

14. A windscreen deflector assembly for an automotive vehicle having a passenger compartment extending between opposing side walls and a rear end, wherein the passenger compartment includes front seats and rear seats, said windscreen deflector assembly comprising:
a flexible membrane element;
a first cross member having a transversely extending beam fixedly secured to an end of the membrane element, the first cross member also having side members extending from respective opposite ends of the beam, each of the side members being generally S-shaped to define an inner portion that extends orthogonally from the transversely extending beam;
a second cross member operatively coupled to the vehicle between a retracted position disposed along the rear end of the passenger compartment and a use position disposed between the front and rear seats of the passenger compartment;
a linkage operatively coupled between the first and second cross members so that the first cross member is carried by the second cross member during movement between the retracted and use positions, whereby the first cross member in the use position is spaced above the second cross member such that the membrane element extends between the first and second cross members to form a generally upright windscreen portion and further extends between the second cross member and the rear end of the passenger compartment to form a generally horizontal cover portion covering the rear seats of the passenger compartment.

15. A windscreen deflector assembly as set forth in claim 14, wherein each side member is generally S-shaped to define an outer portion that is spaced transversely from the inner portion defining a space between the side member and the leg to accommodate the linkage therebetween.

16. A windscreen deflector assembly as set forth in claim 14, wherein the second cross member includes a transversely extending cross bar and a pair of legs extending from respective opposite sides thereof.

17. A windscreen deflector assembly as set forth in claim 16, wherein the linkage includes a pair of first and second links arranged as a four-bar link connecting the side members of the first cross member and the legs of the second cross member.

18. A windscreen deflector assembly as set forth in claim 17 including a rod having one end pivotally coupled to the vehicle and an opposite end pivotally coupled to one of the first and second links.

19. A windscreen deflector assembly as set forth in claim 16, wherein a portion of at least one of the side members of the first cross member and legs of the second cross member is offset transversely to accommodate articulation of the linkage as the first and second cross members are moved between the retracted and use positions.

20. A windscreen deflector assembly as set forth in claim 16, wherein the legs are pivotally coupled to the vehicle for movement of the second cross member between the retracted and use positions.

* * * * *

UNITED STATES PATENT AND TRADEMARK OFFICE
CERTIFICATE OF CORRECTION

| | | |
|---|---|---|
| PATENT NO. | : 7,559,600 B2 | Page 1 of 1 |
| APPLICATION NO. | : 10/588886 | |
| DATED | : July 14, 2009 | |
| INVENTOR(S) | : Frank Neubrand | |

It is certified that error appears in the above-identified patent and that said Letters Patent is hereby corrected as shown below:

Title page, item [57] Abstract, replace both instances of "widescreen" with --windscreen--

Signed and Sealed this

Twentieth Day of October, 2009

David J. Kappos
*Director of the United States Patent and Trademark Office*